UNITED STATES PATENT OFFICE.

PETER FIREMAN, OF TRENTON, NEW JERSEY, ASSIGNOR TO MAGNETIC PIGMENT COMPANY, A CORPORATION OF NEW YORK.

PIGMENT AND METHOD OF PRODUCING THE SAME.

1,392,925.      Specification of Letters Patent.      Patented Oct. 11, 1921.

No Drawing.      Application filed June 22, 1920. Serial No. 390,809.

*To all whom it may concern:*

Be it known that I, PETER FIREMAN, a citizen of the United States, residing at Trenton, in the county of Mercer, State of New Jersey, have invented certain new and useful Improvements in Pigments and Methods of Producing the Same; and I do hereby declare the following to be a full, clear, and exact description of the invention, such as will enable others skilled in the art to which it appertains to make and use the same.

This invention relates to colored pigments produced by oxidation of ferrous hydroxid under regulated conditions, and has for its object the production in a relatively inexpensive manner, of yellow pigments characterized by fine texture and color, and adapted for application to a wide variety of purposes.

The numerous advantages of the invention will be apparent upon the reference to the following specification in which I have described a preferable mode of procedure in producing the pigments. It is to be understood that the description of the invention is illustrative merely and the various modifications may be introduced through substitution of other than the specified materials, and by variation of the relative proportions of these materials, and the temperatures employed, within the scope of accompanying claims; it being my intention to claim as my invention the method whereby the advantageous results, hereinafter described, are accomplished as well as the product of this method.

In United States Letters Patent Nos. 802,928 and 857,044, the treatment of freshly precipitated ferrous hydroxid to produce certain black pigments has been fully described. These pigments have a chemical composition which is indicated, for example, by the formula $FeO.Fe_2O_3$. In the earlier of these patents the pigments produced contain ferrous and ferric iron in the ratio of 1:2, whereas the second patent describes a product in which the ratio of ferrous to ferric iron varies from 1:0.5 to 1:2. In producing these pigments the freshly precipitated ferrous hydroxid is oxidized with air while it is suspended in the mother liquor, which is maintained at a relatively high temperature in the neighborhood of 185° to 203° F. Oxidation is controlled to the extent that when the required ratio of ferrous to ferric iron has been obtained the reaction is stopped, and care is taken to prevent subsequent oxidation beyond the desired ratio. As pointed out, the temperature at which reaction is conducted is relatively high throughout, and no variation in the proportion of the precipitant or the mode of conducting the oxidation to produce other than black pigments is suggested in the patents.

Subsequent research has disclosed that a variety of products, depending upon various factors are produced by oxidizing freshly precipitated ferrous hydroxid. When the reaction is relatively uncontrolled, as in the patents above referred to, a black precipitate of ferrous-ferric oxid is produced. When, however, variations are made in the completeness of precipitation, and oxidation is carried out under lower temperatures, the reaction may be directed to produce colored pigments, and particularly yellow pigments having a chemical composition indicated by formula $Fe_2O_3.H_2O$ which has a brilliant color and high luster. This pigment is voluminous and absorbs from two and one half to three times as much oil as ordinary zinc white. The pigment may be applied to various uses and is especially adapted to form the body of printing ink.

In carrying out the invention it is preferable to employ a mother liquor of ferrous chlorid though other ferrous salts such as the sulfate, for example, are available. As a precipitant, calcium hydroxid is advantageously used, but it is to be understood that other soluble hydroxids or carbonates capable of separating iron, as ferrous hydroxid, may be substituted. Air is preferably employed as an oxidizing agent, but oxygen or gaseous mixtures containing oxygen are also available. The mother liquor is heated by means of steam, which is preferably introduced with the air to produce the desired temperature. The amount of steam admitted must be carefully regulated so that the temperature of the material does not rise above a predetermined maximum, and preferably the increase of temperature occurs gradually in starting the reaction and over a considerable period of time. The reaction is carried out in any suitable container or tank, which is preferably constructed to permit the dissemination of air and steam through the liquid.

As a specific example of the application of the invention calcium hydroxid is added to an aqueous solution of ferrous chlorid having a specific gravity in the neighborhood of 1.060 to 1.090, in quantity sufficient only to precipitate from 75 per cent. to 85 per cent. of the iron. Air and steam are introduced during the precipitation of the iron, the steam being regulated so that the temperature of the mass is not permitted to rise above substantially 100° F., until oxidation is sufficiently complete to bring the ratio of ferrous to ferric iron to substantially 1:0.5. The amount of steam is then gradually increased until the boiling temperature is reached and the admission of air is continued until oxidation is substantially complete, all of the iron being in the form of ferric oxid.

In conducting the reaction the progress thereof may be noted by the colors developed. The precipitate, at first light blue in color, becomes darker, as the reaction continues the color lightens, becomes greenish, is then tinged with yellow, and finally the precipitate assumes a light yellow color, indicating the end of the reaction. After filtering, washing and drying a voluminous, yellow pigment of lemon shade and fine texture is obtained. The drying should be conducted at a temperature of substantially 212° F.

As an alternative sodium carbonate may be used as the precipitant. The ferrous chlorid solution having a specific gravity of about 1.060 is treated with sodium carbonate which is preferably added in a solid state, although it may be previously dissolved. Preferably before the addition of the sodium carbonate, a lively current of air is blown through the ferrous chlorid solution with a little steam only. The sodium carbonate is added in considerable excess while the current of air and steam continues. The heating of the solution by the steam is carried out at a rate which permits the temperature of the solution to rise to substantially 110° F. in about one hour, assuming a volume of solution sufficient to produce substantially one ton of the final product. The admission of steam is regulated so that the temperature of the solution at the end of the second hour is 140° F. and at the end of the third hour is 160° F. The temperature is maintained at the latter point until all of the ferrous iron is converted into ferric iron. Sufficient steam is then admitted to raise the temperature of the solution to the boiling point which is maintained for substantialy one half hour. The latter step while not essential facilitates filtration of the product.

In the course of the reaction, the fresh precipitate of ferrous hydroxid is first light blue in color, then greenish blue and finally acquires a yellowish tinge. Upon continuation of the reaction, the precipitate becomes brownish yellow, and finally clear yellow which is characteristic of the final product. The precipitate is filtered, washed and dried in any suitable manner, the drying being preferably accomplished by means of steam coils, and a product is obtained which is of low specific gravity and provides a clear yellow pigment of great color strength. It is reddish yellow in shade and has been found to carry 2–5% of carbonic acid.

The foregoing example will enable anyone skilled in the art to practice the invention and to produce pigments of the color and character described. Variation in the factors affecting the reaction will result in changing somewhat the color and other characteristics of the pigment, and such variations are within the scope of the invention, which depends upon the discovery that colored pigments may be produced by regulated oxidation of freshly precipitated ferrous hydroxid with careful attention to the details of temperature and mode of directing the reaction.

From the foregoing, the possibility will be readily appreciated of producing desirable pigments at a relatively slight expense, and in quantity sufficient to meet increasing demands for such material. The raw materials for the production of pigments in accordance with the invention are readily available in the market, and may be obtained in any quantity desired at a slight expense. No particular apparatus is essential to the practice of the invention, and it is deemed unnecessary, therefore, to illustrate or describe an apparatus inasmuch as any chemist will readily devise, from materials at hand, suitable apparatus for the purpose.

I claim:

1. As an article of manufacture, a yellow pigment produced by the oxidation of precipitated ferrous hydroxid.

2. As an article of manufacture, a yellow pigment having a chemical composition indicated by the formula $Fe_2O_3.H_2O$ produced by the oxidation of precipitated ferrous hydroxid.

3. As an article of manufacture, a yellow pigment of brilliant color and fine texture, and having a chemical composition indicated by the formula $Fe_2O_3.H_2O$.

4. As an article of manufacture, a yellow pigment consisting of a hydrated oxid of iron produced by the oxidation of precipitated ferrous hydroxid.

5. As an article of manufacture, a yellow pigment consisting of hydrated ferric oxid produced by the oxidation of precipitated ferrous hydroxid.

6. A method of preparing yellow pigment which comprises oxidizing precipitated ferrous hydroxid suspended in the mother liquor at a temperature not substantially exceeding 100° F. until the ratio of ferrous to ferric iron is substantially 1:0.5, increasing the temperature to substantially the boiling point, and continuing the oxidation at the latter temperature.

7. A method of preparing yellow pigment which comprises oxidizing precipitated ferrous hydroxid suspended in the mother liquor at a temperature not substantially exceeding 100° F. until the ratio of ferrous to ferric iron is substantially 1:0.5, continuing oxidation at substantially the boiling temperature and separating and drying the oxidized precipitate at a temperature not substantially exceeding 212° F.

8. A method of preparing yellow pigment which comprises, adding to a solution of an iron salt, a precipitant in quantity sufficient to throw down from 75 per cent. to 85 per cent. of the iron as hydroxid, and oxidizing the precipitate in the mother liquor until the desired yellow color is obtained.

9. A method of preparing yellow pigment which comprises, adding to a solution of an iron salt, a quantity of calcium hydroxid sufficient to precipitate 75 per cent. to 85 per cent. of the iron, oxidizing the precipitate until the desired yellow color is obtained, and separating and drying the oxidized precipitate.

10. A method of preparing yellow pigment which comprises, adding to a solution of ferrous chlorid, calcium hydroxid in quantity to precipitate 75 per cent. to 85 per cent. of the iron, oxidizing the precipitated ferrous hydroxid, at a temperature not substantially exceeding 100° F., until the ratio of ferrous to ferric iron is substantially 1:0.5 and completing oxidation at a temperature approaching 212° F.

In testimony whereof I affix my signature.

PETER FIREMAN.